(12) United States Patent
Hwang et al.

(10) Patent No.: US 7,366,227 B2
(45) Date of Patent: Apr. 29, 2008

(54) CHIP-TO-SYMBOL RECEIVER DESPREADER ARCHITECTURES AND METHODS FOR DESPREADING SPREAD SPECTRUM SIGNALS

(75) Inventors: Syang-Myau Hwang, Cupertino, CA (US); Yiping Fan, Fremont, CA (US); Chen-Yi Chang, Taichung (TW); Hongyu Li, Cupertino, CA (US); Chieh-Yuan Chao, Fremont, CA (US)

(73) Assignee: Hyperband Communications, Inc., Milpitas, CA (US)

( * ) Notice: Subject to any disclaimer, the term of this patent is extended or adjusted under 35 U.S.C. 154(b) by 714 days.

(21) Appl. No.: 10/876,160

(22) Filed: Jun. 23, 2004

(65) Prior Publication Data

US 2005/0105597 A1 May 19, 2005

Related U.S. Application Data

(63) Continuation-in-part of application No. 10/712,643, filed on Nov. 13, 2003.

(51) Int. Cl.
*H04B 1/00* (2006.01)
(52) U.S. Cl. ............... 375/147; 375/136; 375/142; 375/152; 375/153; 375/316
(58) Field of Classification Search ............... 375/147, 375/136, 142, 152, 153, 316
See application file for complete search history.

(56) References Cited

U.S. PATENT DOCUMENTS 6,351,462 B1 *   2/2002   Komatsu ............... 370/342
6,601,078 B1 *   7/2003   Bondarowicz et al. ...... 708/422
7,076,015 B2 *   7/2006   Bhatoolaul et al. ......... 375/365

\* cited by examiner

*Primary Examiner*—Ted Wang
(74) *Attorney, Agent, or Firm*—Bacon & Thomas, PLLC

(57) ABSTRACT

In a spread spectrum system, methods and despreader architectures for despreading the received spreaded codes with the use of a single correlator and a single correlation code is provided. Before despreading the incoming received spreaded codes, a single correlation code is generated using a symbol from a set of symbols that has been mapped into a set of differential encoded PN codes. Despreading output samples for each received spreaded code are obtained by correlating the received spreaded code with this single correlation code. Correlation is accomplished by multiplying each received sample of the received spreaded codes with the correlation code samples and accumulating the products of this multiplication. After correlation, the index for the maximum or minimum peak of the despreading output samples for each code is identified. This index can then be mapped into a symbol corresponding to the transmitted information. Corresponding despreader architectures comprise of a number of taps attached to a series of shift registers. Received samples of each received spreaded codes are inputted into the shift registers. The despreader architectures accumulates the products of multiplication of the value of the shift register with a predetermined value associated with each tap to produce the despreading output samples of a received spreaded code. It identifies the despreading output index producing the maximum of the absolute value of the despreading output and maps said index into a symbol corresponding to the transmitted information.

8 Claims, 5 Drawing Sheets

FIGURE 5

| 1 | 2 | 3 | 4 | 5 | 6 | 7 | 8 | 9 | 10 | 11 | 12 | 13 | 14 | 15 | 16 |

... | 57 | 58 | 59 | 60 | 61 | 62 | 63 | 64 |

Despreading Output Indexes

CHIP-TO-SYMBOL RECEIVER DESPREADER ARCHITECTURES AND METHODS FOR DESPREADING SPREAD SPECTRUM SIGNALS

CROSS REFERENCE

This application is a continuation-in-part of the United States patent application entitled "Receiver Based Method for DeSpreading of Spread Spectrum Signal," filed on Nov. 13, 2003, having a U.S. application Ser. No. 10/712,643.

FIELD OF INVENTION

The present invention relates to spread spectrum communications, and in particular, to methods and receiver despreader architectures for despreading spread spectrum signals.

BACKGROUND

Spread spectrum communications system spread information over bandwidths much larger than those actually required to transmit the information. The spread spectrum technologies have been widely used both in military and commercial wireless communication systems such as the Global Positioning System (GPS), IS2000 mobile communications systems, and applications based on the emerging IEEE 802.15.4 standard. The advantages of using the spread spectrum approach are many. Spread spectrum systems are very robust with respect to noise and interferences due to the spreading gain. These systems are also inherently secure where multi-path fading has a lesser impact.

In the IEEE 802.15.4 standard, the transmitted data stream are grouped into 4 bits as a symbol and mapped and spreaded, i.e., encoded into 16 ary Psuedo Noise (PN) spreading codes where each of the 16 possible symbols is represented by a 32 bit PN code. Table 1 shows the 16 spreading PN codes defined by the IEEE 802.15.4 standard ("original PN codes") where Symbol 0 through Symbol 15 is mapped into Codes 1 through 16. Each code is 32-bit long and represents 4 binary digits. The codes are designed to have the following properties: (1) Codes 2 to 8 are obtained by cyclicly shifting right 4, 8, 12, 16, 20, 24, 28 bits of the first code (symbol 0); and (2) Codes 9 to 16 are the inversion of odd-indexed chip value of codes 1 to 8.

TABLE 1

| SYM | Original PN Code<br>ORIGINAL PN CODES |
|---|---|
| 0 | 11011001110000110101001000101110 |
| 1 | 11101101100111000011010100100010 |
| 2 | 00101110110110011100001101010010 |
| 3 | 00100010111011011001110000110101 |
| 4 | 01010010001011101101100111000011 |
| 5 | 00110101001000101110110100111100 |
| 6 | 11000011010100100010111011011001 |
| 7 | 10011100001101010010001011101101 |
| 8 | 10001100100101100000011101111011 |
| 9 | 10111000110010010110000011110111 |
| 10 | 01111011000110010010110000001111 |
| 11 | 01110111110111000100100101100000 |
| 12 | 00000111011110111000110010010110 |
| 13 | 01100000011101111011101100110001 |
| 14 | 10010110000011101111101110001100 |
| 15 | 11001001011000000111011110111000 |

In order to utilize the full potential of spread spectrum systems, spreading codes such as the original PN codes are constructed to have good auto- and cross-correlation properties. That is, with correlation during despreading, one code can effectively differentiate itself from the other codes under noisy conditions. FIG. 1 shows the cross-correlation properties of the original PN codes for the 2.4 GHz band between Code 1 and Codes 0-15. The first point represents the code correlating to Code 1 and its auto-correlation output. The correlation peak (FIG. 1, Code Index 1, value 32) appears when Code 1 correlates to itself. The second point represents the code correlating to Code 2 and its cross-correlation output and so on.

The spreaded PN codes are modulated using minimum shift keying (MSK) modulation schemes before transmission. MSK modulations schemes have many robust features and have been adopted in standards such as GSM, Bluetooth, and DECT.

A spreaded spectrum receiver has to demodulate and then despread the received signal with spreading codes. A typical implementation of these processes is shown in FIG. 2. Here, the received signal is first demodulated (22). Then, the demodulated signal is processed (24) using the spreading codes to generate the despread output by multiplying the demodulated received code with the spreading codes (26) and accumulating the products of the multiplication (28). The despread output is then used for bit or symbol decision-making or as input for error correction processing.

The receiver demodulation of MSK modulated signals can be either coherent or non-coherent demodulation. However, the receiver architecture of coherent demodulation is more complex and is more expensive to implement. In addition to data path match filtering, despreading and demapping, the coherent receiver requires carrier recovery and timing recovery circuits to determine the phase and frequency of carrier and timing clock in order to successfully recover the data stream. Therefore, coherent demodulation scheme of MSK signals are seldom adopted in industry due to the high cost in implementation.

The use of differential demodulation, a non-coherent demodulation, as the MSK demodulation scheme eliminates the necessity of carrier recovery circuits. Differential demodulation converts carrier frequency offset into DC offset thus requiring only DC removal circuits that are much simpler than carrier recovery circuits.

However, the unique properties of original PN codes are lost and changed after differential demodulation. The differential demodulated signals will require a new set of differential encoded PN codes for despreading with the use multiple correlators.

U.S. patent application Ser. No. 10/712,643 provides a novel receiver transformer that transforms the received demodulated signal. It also transforms the original PN sequence into a transformed differential encoded PN codes ("Differential Encoded PN Codes") as shown in Table 2 for subsequent processing of the transformed received signal. With special setting on the initial condition of the differential encoded PN sequence, this Differential Encoded PN Codes have better properties than the original PN codes. The new codes have the following superior properties: (1) Code 2 (symbol 1) to Code 8 (symbol 7) are obtained by cyclicly shifting right 4, 8, 12, 16, 20, 24, 28 bits of the first code (symbol 0); and (2) Codes 9 (Symbol 8) to Codes 16 (Symbol 15) are the inversion of Codes 1 to 8. These new, superior properties allow a simple despeader/demapper implementation.

TABLE 2

Differential Encoded PN Codes

| SYM | DIFFERENTIAL PN CODES |
|---|---|
| 0 | 1110000001101111010111001101100 |
| 1 | 1100110000001110111101011100110 |
| 2 | 0110110011000000111011110101110 |
| 3 | 1110011011001110000001101111010 |
| 4 | 1010111001101100111000000111011 |
| 5 | 0111101011100110110011100000111 |
| 6 | 0111011110101110011011001110000 |
| 7 | 0000011101111010111001101100111 0 |
| 8 | 0001111100010000101000110010011 |
| 9 | 0011000111110001000010100011001 |
| 10 | 1001001100011111100010000101000 1 |
| 11 | 0001100100110001111110001000010 1 |
| 12 | 0101000110010011000111111000100 0 |
| 13 | 1000010100011001001100111111000 |
| 14 | 1000100001010001100100110001111 1 |
| 15 | 1111100010000101000110010011000 1 |

However, the despreading of Table 2 differential encoded PN codes is customarily accomplished using 16 correlators, one for each code of the differential encoded PN codes. Each received code of a demodulated transformed received signal has to be correlated with the 16 correlators to determine the maximum value of the correlation in order to determine the corresponding symbol for that received code. The hardware implementation of this method of despreading is very expensive and has to occupy a lot of ASIC area. In addition, this method of despreading requires the use of timing recovery circuits to address the timing shift caused by the sampling clock mismatch between the transmitter and the receiver.

Therefore, it is desirable to have innovative methods for despreading spread spectrum signals to overcome the shortcoming of prior art technologies.

SUMMARY OF INVENTION

It is therefore an object of the present invention to provide simple methods for despreading of spread spectrum signals.

It is another object of the present invention to provide methods for generating correlation codes such that only one correlator is required for the despreading of spread spectrum signals.

It is another object of the present invention to provide methods for despreading spread spectrum that is robust to timing frequency shifts generated between the transmitter and receiver clocks.

This invention provides novel methods for the despreading and demapping of demodulated signals, transformed and mapped into a set of Differential Encoded PN Codes, into its original symbols by the use of a single correlation code. Novel single correlation codes are generated from one of the symbols that has been mapped into the Differential Encoded PN Codes. Each received code of a received spreaded signal is correlated with said generated single correlation code to obtain despreading output samples of the despreading output. The index for the maximum positive or negative peak of the despreading output samples is identified, and then mapped into a symbol corresponding to the transmitted information.

This invention also provides novel receiver despreader architecture for each code of despreading received spreaded signals comprising of shift registers with taps attached to the inputs of said shift registers. Received samples of each received spreaded code are inputted into the shift registers.

An embodiment of the receiver despreader architecture operates to calculate the despreading output samples of the despreading output by accumulating the products of the multiplication of the input to the shift registers with predetermined values associated with the taps. The predetermined value associated with a tap corresponds to the value of the correlation samples of the generated correlated codes. The despreading output index for the maximum of the absolute values of the despreading output samples is identified and then mapped into a symbol corresponding to the transmitted signal.

An advantage of the present invention is that it provides simple methods for despreading of spread spectrum signals.

Another advantage of the present invention is that it provides methods for generating correlation codes such that only one correlator is required for the despreading of spread spectrum signals.

Another advantage of the present invention is that it eliminates the need for timing recovery circuits to track sampling clock frequency mismatches between the transmitter and receiver.

DESCRIPTION OF DRAWINGS

The foregoing and other objects, aspects and advantages of the invention will be better understood from the following detailed description of preferred embodiments of this invention when taken in conjunction with the accompanying drawings in which:

FIG. 5 shows the despreading output indexes.

DETAILED DESCRIPTION OF THE PREFERRED EMBODIMENTS

Figure 1:
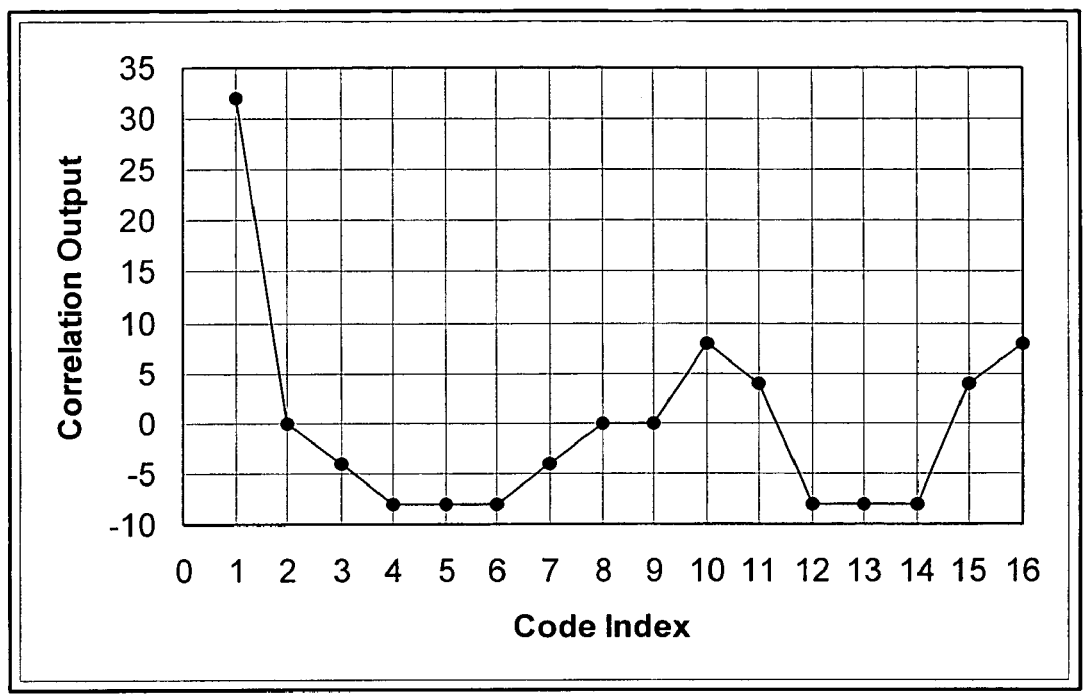
FIG. 1 illustrates the cross-correlation properties of the original PN codes for the 2.4GHz band between Symbol 0 and Symbols 0-15.
Figure 2:
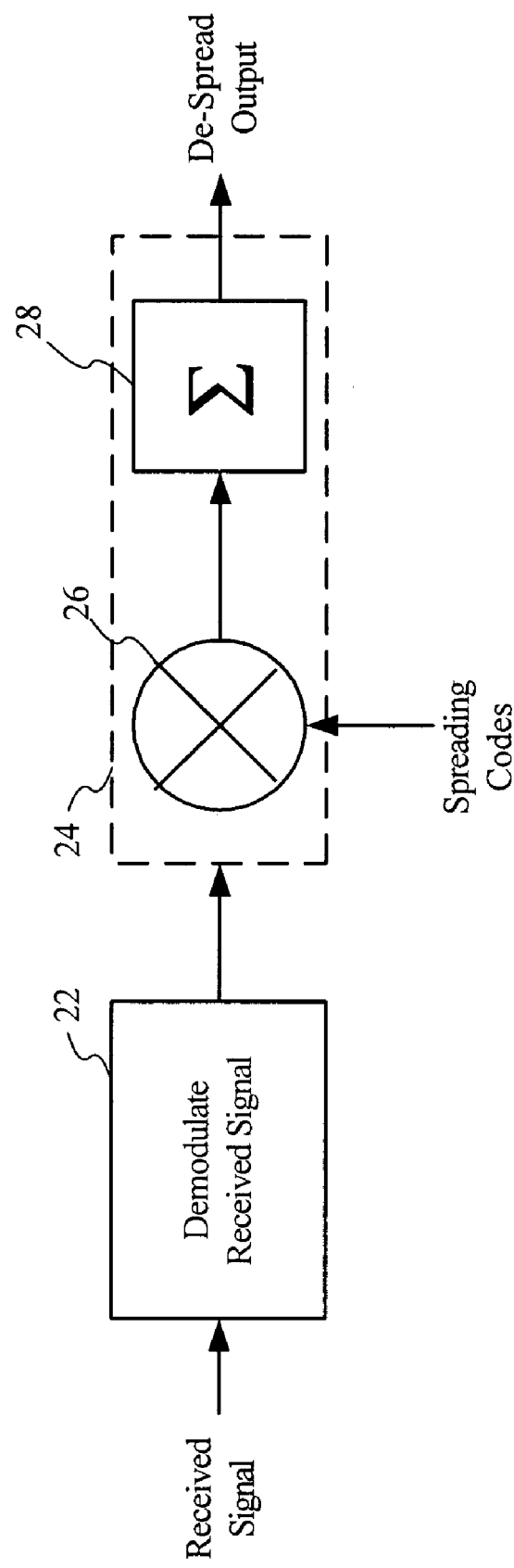
FIG. 2 illustrates a typical implementation of the despreading process.

This invention provides innovative methods and receiver architectures for the despreading and demapping the codes of demodulated signals into its original symbols by the use of a single correlation code. These demodulated signals have been transformed and mapped into a set of a set of differential encoded PN codes before the despreading process. Methods for generating these single correlation codes are developed by exploiting the unique functional inter-relationships between the different codes in the set of differential encoded PN codes. These methods of despreading also eliminate the necessity of timing recovery circuits and the use of multipliers at the same time.

After demodulation, a received signal contains codes to be despreaded for symbol decision-making. Each received spreaded code $r_x$ is series of received samples $r_x(k)$ where $r_x(k)$ denotes the kth received sample of the received code that is being despreaded and k is the received index of said received sample.

The initial clock timing and PN code phase are acquired during signal detection of preambles such that the despreader know where to start despreading the incoming received signals. The method for despreading a received code involves the use of a single correlation code and comprises of the following steps:

generating a despreading output as a function of said received spreaded code and said single correlation code;

identifying the despreading output index of the maximum of the absolute value of said despreading output, $k_{max}$; and mapping $k_{max}$ into a symbol of a set of symbols corresponding to the transmitted signal.

The following embodiment illustrates the method and despreader architecture for the despreading of 64-sample received codes corresponding to a transmitted signal whose symbols have been spreaded and mapped into the Differential Encoded PN Codes of Table 2.

The Generation of A Correlation Code

The first step in this despreading is to generate a correlation code by utilizing the functional relationships between the codes in the set of differential encoded PN codes Once this single correlation code is generated, it is used for the despreading of all received spreaded codes. The following preferred embodiment generates a correlation code, $C_{128}$, for a received spreaded code having 64 received samples that have been spreaded and mapped into the Differential Encoded PN Codes of Table 2. It can be generated by using Symbol 0 corresponding to Code 1. For received spreaded codes that has been transformed and mapped into the 16 ary Differential PN Codes, correlation codes corresponding to the other 15 codes can be similarly constructed. However, only one correlation code needs to be generated since only one is needed for the despreading.

Here, $C_{128}$ has 128 samples. It is generated by Symbol 0 of Table 2 that has been upsampled twice, repeated, and shifted by 4 samples and mapped. If the 32 bits of Symbol 0 is denoted by $[d_0, d_1, d_2, d_3, \ldots d_{29}, d_{30}, d_{31}]$, the correlation code with 128 samples is generated as follows:

(1) Symbol 0 is mapped into a 32 sample code denoted by: $[c_0, c_1, c_2, \ldots c_{29}, c_{30}, c_{31}]$ where $c_i=d_i=1$ when $d_i=1$, and $c_i=-1$, when $d_i=0$ where $c_i$ is the ith sample of the mapped function and $d_i$ denotes the ith bit in Symbol 0;

(2) This mapped function is upsampled by inserting zeroes after each $c_i$ to form a 64 sample code denoted by $[c_0, 0, c_1, 0, c_2, 0, \ldots c_{29}, 0, c_{30}, 0, c_{31}, 0]$;

(3) The above code is repeated to form a 128 sample code denoted by: $[c_0, 0, c_1, 0, c_2, 0, \ldots c_{29}, 0, c_{30}, 0, c_{31}, 0, c_0, 0, c_1, 0, c_2, 0 \ldots c_{29}, 0, c_{30}, 0, c_{31}0]$;

(4) The last 4 samples of this 128 sample code is then cyclicly shifted right to become the first 4 correlation code samples of the correlation code $C_{128}$ having 128 correlation code samples represented by:

$C_{128}=[c_{30}, 0, c_{31}, 0, c_0, 0, c_1, 0, c_2, 0, \ldots c_{29}, 0, c_{30}0, c_{31}, 0, c_0, 0, c_1, 0, c_2, 0, \ldots c_{29}, 0]$ For the correlation code generated with Symbol 0, $$C_{128} = [-10 - 10101010 - 10 - 10 - 10 - 10 - 10 - 10101010$$
$$-1010101010 - 1010 - 10101010 - 10 - 101010 - 10$$
$$1010 - 10 - 10101010 - 10 - 10 - 10 - 10 - 10 - 10$$
$$101010 - 1010101010 - 1010 - 10101010 - 10 - 1010$$
$$10 - 101010].$$

Generation of Despreading Output by Multiplying and Accumulating the Received Spreaded Code with the Correlation Code One method to calculate the despreading outputs of a received code is by accumulating the multiplication of the correlation codes samples of the correlation code with the received samples of the received code. In the embodiment where the received code has 64 received samples and $r_x(n)$ is the nth sample of the received signal where $1 \leq n \leq 64$, one method to calculate $r_c(k)$, the kth sample of the 64 sample despreading output, also called the correlation output, is to accumulate the multiplied products of the received code with the correlation code $C_{128}$. That is, the (n+k)th correlation code sample of the correlation code, $C_{128}(n+k)$, is multiplied by the nth received sample of the received code, $r_x(n)$, for each of the 64 received samples of the received code and the products of the multiplication for all 64 samples are accumulated to become $r_c(k)$. This process can be represented mathematically as follows:

$$r_c(k) = \sum_{n=1}^{N} r_x(n) C_{128}(k+n),$$  Equation (1)

$1 \leq k \leq N$ where $N = 64$

Identifying $k_{max}$, the Despreading Output Index of the Maximum of the Absolute Value of said Despreading Output The 64 samples of the despreading output, $r_c(k)$, for each k between 1 and 64 can be calculated using Equation (1) for $1 \leq k \leq 64$. The maximum of the absolute value of the despreading output, i.e., the positive peak or the negative peak of the despreading output can be found. This maximum despreading output identifies the despreading ouput index $k_{max}$ corresponding to the either the positive or negative peak of the despreading output samples, $r_c(k)$. Mathematically $k_{max}$ is defined by the following equation.

$$r_c(k_{max}) = \max_{1 \leq k \leq N} |r_c(k)|$$  Equation (2)

Symbol Decision Making by Mapping $k_{max}$ into a Symbol in a Set of Symbols Corresponding to the Transmitted Information Once $k_{max}$ is identified, it can be used to map the received code to the original symbols, i.e., the original symbols of the transmitted signal in a set of symbols that have been mapped into said set of Differential Encoded PN codes. The despreading outputs have 64 despreading output samples and each 8 despreading output samples of the despreading output can be mapped to one symbol. Since, the PN codes contain 16 symbols to despread, the unique feature of these differential encoded spreading codes is needed to identify the received output for the symbols 8 through 15. In the differential encoded PN codes, the first 8 codes are exactly the inverse of the last 8 codes. If a code among the last 8 symbols is received, the received output $r_c(k)$ will be a negative peak. Therefore, positive peaks in the despreading outputs map to first 8 symbols while the negative peaks map to last 8 symbols. In other words, if $r_c(k_{max})>0$, when $1 \leq k_{max} \leq 8$, the received spreaded code is despreaded and mapped into Symbol 0. When $9 \leq k_{max} \leq 16$, the received spreaded code is despreaded and mapped into Symbol 1, and so on. If $r_c(k_{max})<0$, when $1 \leq k_{max} \leq 8$, the received spreaded code is despreaded and mapped into Symbol 8, when $9 \leq k_{max} \leq 16$, the received spreaded code is despreaded and mapped into Symbol 9, and so on. Ideally, for perfect received code with no frequency mismatch, $k_{max}$, the despreading output indexes of the maximum of the absolute value of the despreading output samples are at 5, 13, 21, 29, 37, 45, 53, and 61. They correspond to the symbols 0, 1, 2, 7 if $r_c(k_{max})>0$ and correspond to symbols 8, 9, ... 15 when $r_c(k_{max})<0$ With timing frequency offset, the peaks of the despreading outputs will move from those perfect positions because the sampling phase offset.

Another method to map the symbol corresponding to the received code is to compute an index m with the following equation:

$$m = \left(9 - \left\lceil \frac{k_{\max}}{8} \right\rceil \right) \mod 8 \quad \text{if } r_c(k_{\max}) \geq 0 \quad \text{Equation (3)}$$

$$m = \left(9 - \left\lceil \frac{k_{\max}}{8} \right\rceil \right) \mod 8 + 8 \quad \text{if } r_c(k_{\max}) \leq 0. \quad \text{Equation (4)}$$

Index "m" denotes the corresponding number of the symbol that has been mapped into the PN codes. In other words, for $r_c(k_{max})>0$, and $1 \leq k_{max} \leq 8$, then m=0 and the code received corresponds to Symbol 0. Similarly, m corresponds to the Symbol m for $1+8*m \leq k_{max} \leq 8*(m+1)$ for $r_c(k_{max})>0$.

The above-described methodology can similarly be used to despread multiple codes in the received signal. Thus, if $r_x(n,l)$ denotes the nth sample of the lth code of the received codes, and $r_c(k,l)$ denotes the kth sample of the despreading output samples for the for the lth code, then the following equations defines $k_{max}$, l, the despreading output index for the lth code, and m (l), the index for the lth code corresponding to the number of the symbol for the lth code as listed in the Table 2.

$$r_c(k, l) = \sum_{n=1}^{N} r_x(n, l)C_{128}(k + n) \quad 1 \leq k \leq N, \quad \text{Equation (1a)}$$

where $N = 64$ $$r_c(k_{\max,l}, l) = \max_{1 \leq k \leq N} |r_c(k, l)| \quad \text{Equation (2a)}$$

$$m(l) = \left(9 - \left\lceil \frac{k_{\max,l}}{8} \right\rceil \right) \mod 8 \quad \text{if } r_c(k_{\max,l}) \geq 0 \quad \text{Equation (3a)}$$

$$m(l) = \left(9 - \left\lceil \frac{k_{\max,l}}{8} \right\rceil \right) \mod 8 + 8 \quad \text{if } r_c(k_{\max,l}) \leq 0 \quad \text{Equation (4a)}$$

Figure 4:
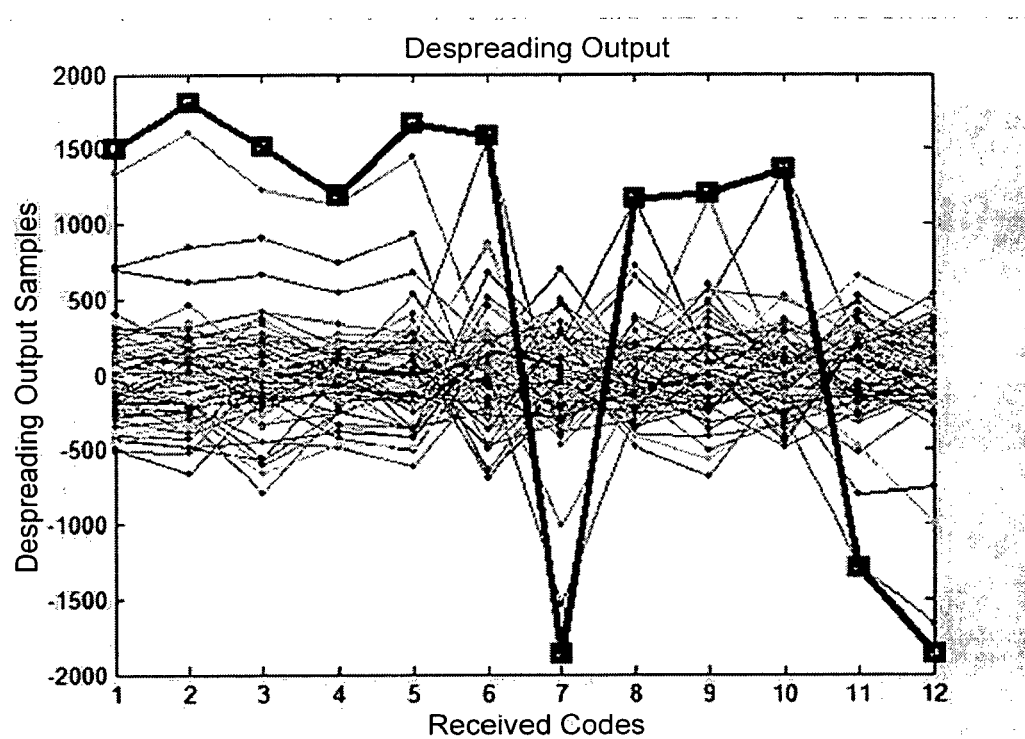
FIG. 4 is an illustration of a despreading output of an embodiment.

Examples of despreading outputs obtained by the method in this embodiment is illustrated in FIG. 4 where the y axis denotes the despreading output samples $r_c(k,l)$ for different despreading output indexes for each code "l" on the x axis. The thin lines are the noise floors, i.e., $r_c(k,l)$ for each k and l where the despreading output is not at its maximum while the thick line is the maximum values for the despreading outputs, i.e., $$r_c(k_{\max,l}, l) = \max_{1 \leq k \leq N} |r_c(k, l)|.$$

The noise floor for this example is high as the signal to noise ratio, SNR, is 8 dB. However, even with this high SNR, and the maximum values of the despreading output, $r_c(k_{max}, l)$ is not far from other spreading output $r_c(k, l)$ where $k \neq k_{max}$, the symbol decision making can be accomplished correctly after despreading, as long is the maximum still occurs with the 8 sample window of $k_{max}$.

Despreader Architecture

Figure 3:
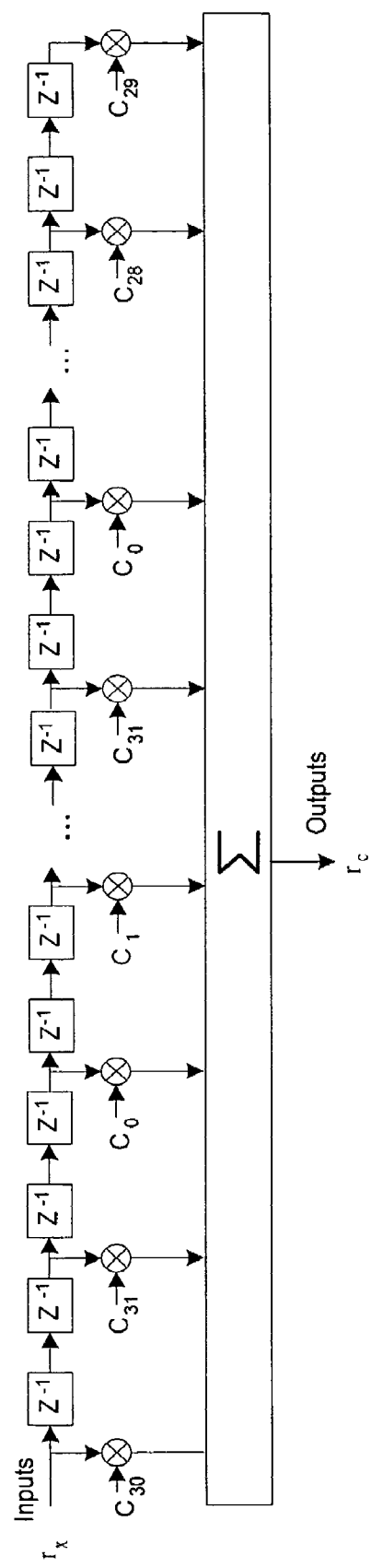
FIG. 3 illustrates a presently preferred despreading architecture of the present invention.

FIG. 3 illustrates a despreader architecture for the despreading method described in the above embodiment. The shift registers, $Z^{-1}$'s, have 128 unit delays and 64 taps. The taps are positioned at the inputs of every other register. The operation of the shift register starts when 64 incoming samples of the inputs of the received code $r_x$ occupy the first 64 shift registers. Each tap multiplies the value of the received sample being received in the shift register with a predetermined value related to the correlation code, $C_{128}$ where the predetermined value associated with the ith tap is the value of the (2 i–1)th correlation code sample. The despreading output sample, $r_c(k)$ with despreading output index k is calculated as the sum of the products of multiplication at all taps. After this computation, the data/samples are then shifted by one and the computation repeated. The data/samples will keep on shifting and the output of the addition tree is captured until the maximum of the absolute value of the despreading output is obtained. Whenever the maximum value of the output is captured, the index position of the sample in the shift register is recorded and that information will be used to determine $k_{max}$ and decide on the despread symbols as indicated in Equations 2 and 3. Using the unique feature of the differential encoded PN codes, if a received signal among the last 8 symbols is received, the output is a negative peak. Therefore, positive outputs map to the first 8 symbols while the negative peaks map to last 8 symbols. For example, where the maximum value of the output is positive and the index is among first 8 samples, then the despread symbol is Symbol number 0 (ZERO). If the maximum value happens among samples number 9 to sample number 16, the despread symbol is determined to be the Symbol 1 and so on.

With the superior properties of the new code set, the demapping algorithm is very easy to implement in hardware and is described in Equations 3 and 3a. In other embodiments where the alternate samples of the correlation code is not zero, taps can be inserted at the inputs of every shift register of the above-described despreader architecture so that the multiplication process is performed at all registers instead of every other register.

Symbol Timing Track

Sampling clock mismatch can reach as high as +/−40 ppm as allowed by the original PN codes. Therefore, if a transmitter has a +40 ppm sampling clock frequency error and a receiver has a −40 ppm sampling clock error, the total frequency error is 80 ppm. This sampling clock frequency mismatch between the transmitter and the receiver causes the sampling phases of the received signals to continually change, and, at times, some samples are dropped or repeated. As a result, at the receiver side, some mechanism has to be built to compensate and track the timing phase changes. In some applications, it is possible to remove the frequency error before despreading by using closed loop timing recovery circuits. However, the designs of these closed loop recovery circuits are difficult. They are power sensitive and require a lot of fine tuning making them expensive for many applications.

Embodiments of this invention do not require the use of closed loops since their inherent properties build in tolerances to sampling clock mismatch. Therefore, hardware implementation of this despreading method is much easier and cheaper. In generating the despreading correlation code from Symbol 0 of the differential encoded PN code, the last 4 samples of the correlation code is cyclicly shifted right such that, when there the incoming signals are perfect and there is no noise, the despreading output indexes for the 16 symbols start at 5 and are separated by 8. That is, for perfect incoming signals, the despreading output indexes are at 5, 13, 21, 29, 37, 45, 53, 61, 69, 77, 85, 93, 101, 109,117, and 125. The perfect symbol position for Symbol 0 is adjusted to occur at 5 to take into account that the timing drift can occur in both directions. With timing frequency offset, the peaks of the despreading outputs will move from those perfect positions because of the sampling phase offset. However, for short burst, these peaks do not move much with limited timing frequency offset.

For example, with the maximum timing frequency offset of 80 ppm in this embodiment with the longest burst of 127 bytes payload, the number of samples that can be moved with changes in the sampling phase is calculated to be:

$$80e{-}6*(1064/4*32*2)=1.3619 \text{ samples}$$

where 80e−6 is the PPM value; 1064, i.e., (127*8+32+8+8), is the number of bits transmitted; the factor 4 accounts for the bits to symbol conversion; the factor 32 accounts for the spreading ratio; and the factor 2 is the up-sampling rate during despreading for the chips.

The outputs of the despreading output indexes are shown in FIG. 5. The underlined numbers are assumed to be perfect signal position of the despreading output indexes. The phase offset will cause the despreading output indexes to shift from the perfect signal position. However, since perfect signal positions of the symbols are separated by 8, as long as the peak indexes do not move more than 3 samples, a correct decision on the symbol that is transmitted is still made. This is expressed in equations 3 and 3a with cover timing phase offset of ±3 samples. PN despreading is also robust if the PN code phase is within half chip interval since the correlation code derived from Symbol 0 are 2 times upsampled.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. A method for despreading a received spreaded code as a function of a correlation code, comprising the steps of:
generating a despreading output as a function of said received spreaded code and said correlation code, said despreading output sample being identified by a despreading output index;
identifying the index of the particular despreading output sample having the maximum absolute value of all of said despreading output sample, $k_{max}$; and
mapping said $k_{max}$ to a symbol in a set of symbols, said set of symbols corresponding to information encoded in said received spreaded code,
wherein said correlation code is generated from a symbol in said set of symbols that has been mapped into a set of differential encoded PN codes, said correlation code being generated by the following steps:
selecting a symbol from said set of symbols;
mapping said selected symbol to form a mapped symbol;
upsampling said mapped symbol;
repeating said upsampled symbol; and
after repeating said upsampled symbol, cyclically shifting said repeated upsampled symbol to the right to form said correlation code.

2. The method for despreading a received spreaded code of claim 1, wherein in said mapping step for mapping said selected symbol to form said mapped symbol, the value of each bit of the symbol is mapped into itself when the value of the bit in said symbol is not equal to zero (0); and the value of each bit of the symbol is mapped into (−1) when the value of said bit of said symbol is zero (0).

3. The method for despreading a received spreaded code of claim 1, wherein said generating step to generate said despreading output is a method comprising the steps of:
multiplying said received spreaded code with said correlation code; and
accumulating the products of said multiplication to form said despreading output.

4. The method for despreading a received spreaded code of claim 1,
wherein said despreading output comprises a series of despreading output samples, $r_c(k)$, where k is a despreading output index of said despreading output samples;
wherein said received spreaded code comprises a series of received samples, $r_x(n)$, wherein n is an index of said received samples;
wherein said correlation code comprises a series of correlation code samples, $C(m)$, wherein m is an index of said correlation code sample; and
wherein said generating step for generating said despreading output sample, $r_c(k)$, comprises the following steps:
multiplying $r_x(n)$ by $C(n+k)$, for each received sample; and
adding the products of said multiplication for every received sample to form said $r_c(k)$.

5. The method for despreading a received spreaded code of claim 1,
wherein said despreading output comprises a series of despreading output samples, $r_c(k)$, where k is a despreading output index of said despreading output samples;
wherein said received spreaded code has N received samples, $r_x(n)$, wherein n is an index of said received samples;
wherein said correlation code comprises a series of correlation code samples, $C(m)$, wherein m is an index of said correlation code sample; and
wherein said generating step for generating said despreading samples of said despreading output is represented by the following mathematical formula:

$$r_c(k) = \sum_{n=1}^{N} r_x(n)C(k+1).$$

6. The method for despreading a received spreaded code of claim 1,
wherein said despreading output comprises a series of despreading output samples, $r_c(k)$, wherein k is an despreading output index of said despreading output samples;
wherein said correlation code is a function of said set of symbols that has been mapped into a set of differential encoded PN codes; and wherein said mapping step comprises the following step:

mapping $K_{max}$ into said a symbol from said set of symbols.

7. The method for despreading a received spreaded code of claim 1, wherein said despreading output comprises a series of despreading output samples, $r_c(k)$, wherein k is an despreading output index of said despreading output samples;

wherein said correlation code is a function of said set of symbols that has been mapped into a set of differential encoded PN codes; and wherein said mapping step comprises the following steps:

calculating an index, m, with the following formula:

$$m = \left(9 - \left\lceil \frac{k_{max}}{8} \right\rceil\right) \mod 8 \quad \text{if } r_c(k_{max}) \geq 0$$

$$m = \left(9 - \left\lceil \frac{k_{max}}{8} \right\rceil\right) \mod 8 + 8 \quad \text{if } r_c(k_{max}) \leq 0;$$

and mapping m into a symbol from said set of symbols.

8. A structure for despreading received spreaded codes having a series of received samples, comprising:

a series of shift registers for receiving said received samples, storing said received samples, and transmitting said received samples;

a plurality of taps attached to the inputs of said shift registers, wherein each of said taps is a means for multiplying a predetermined value assigned to said tap with the input of the attached shift register, wherein said predetermined values assigned to said taps are functions of a correlation code;

means for adding the products of multiplication from all taps to obtain despreading output samples;

means for identifying the despreading output index of a particular despreading output sample having the maximum absolute value of said despreading output samples; and means for mapping said despreading output index into a symbol corresponding to the transmitted information, wherein said taps are attached to the inputs of every other one of said shift registers wherein said correlation code is generated using the method, comprising the steps of:

selecting a symbol corresponding to said set of symbols that has been mapped into a set of differential encoded PN codes;

mapping said selected symbol to form a mapped symbol;

upsampling said mapped symbol; repeating said symbol; and wherein the predetermined value assigned to the ith tap is the value of the (2i-1)th sample of said correlation code.

* * * * *

UNITED STATES PATENT AND TRADEMARK OFFICE
CERTIFICATE OF CORRECTION

PATENT NO. : 7,366,227 B2  Page 1 of 1
APPLICATION NO. : 10/876160
DATED : April 29, 2008
INVENTOR(S) : Syang-Myau-Hwang et al.

It is certified that error appears in the above-identified patent and that said Letters Patent is hereby corrected as shown below:

Title Page, Item (73)
  Please change assignee from "Hyperband Communication, Inc." to
--Uniband Electronic Corp.--

Signed and Sealed this

Thirtieth Day of March, 2010

David J. Kappos
*Director of the United States Patent and Trademark Office*